UNITED STATES PATENT OFFICE.

FRANCIS C. FRARY, OF MINNEAPOLIS, MINNESOTA.

PROCESS OF PRODUCING SULFIDS OF PHOSPHORUS.

1,153,054.  Specification of Letters Patent.  Patented Sept. 7, 1915.

No Drawing.  Application filed February 3, 1915. Serial No. 5,912.

*To all whom it may concern:*

Be it known that I, FRANCIS C. FRARY, a citizen of the United States, residing at Minneapolis, in the county of Hennepin and State of Minnesota, have invented certain new and useful Improvements in Processes of Producing Sulfids of Phosphorus; and I do hereby declare the following to be a full, clear, and exact description of the invention, such as will enable others skilled in the art to which it appertains to make and use the same.

My invention has for its object to provide an improved process for the production of sulfids of phosphorus, and also to produce sulfids of phosphorus in an improved commercial form.

It is known that a combination of sulfur and phosphorus to form true sulfids of phosphorus does not take place at the ordinary temperature, but when the mixture is heated to a certain point, the reaction takes place, and is likely to be of explosive violence, if yellow phosphorus is employed, on account of the heat evolved. This violence may be largely prevented by using red phosphorus, but this is more expensive. In any case, the reaction is hard to control, and the product is a hard solid which must be finely ground for use in making matches, and always consists of a mixture of sulfids. It is well known that this may be produced from the above-mentioned impure mixture by treatment with steam or hot water, which decomposes the higher sulfids. By my process, the pure sesquisulfid can be produced in one operation, from yellow phosphorus, without appreciable loss of material; or a homogeneous mixture of the different sulfids, with free sulfur, if desired, may be produced.

In accordance with my invention, instead of simply heating together the sulfur and phosphorus, I add to them an inert, high-boiling liquid, capable of acting as a solvent for one or both of these elements at a temperature below the boiling point of said liquid. In this way I form a sulfid or mixture of sulfids of phosphorus in a state of solution. By heating this solution for a time at a sufficiently high temperature, the union may be made complete; and if the two elements are taken in the proper proportion, the sesquisulfid may be obtained in a high state of purity, if desired, or mixed with any given proportion of higher sulfids. Upon cooling this solution, preferably with agitation, most of the sulfid separates in the form of microscopic crystals, and may then be removed and freed from the solvent by appropriate well known means. The presence of this inert liquid, by reason of its bulk and capacity for absorbing heat, prevents the reaction from becoming explosive, and by dissolving the reacting elements and the products of the reaction, facilitates the completion of the desired reaction and the formation of the pure product. I prefer to use for this liquid some substance which burns with great difficulty, such as chlorid of naphthalin, or a mixture of the chlorids of naphthalin, chlorids of other hydrocarbons of the naphthalin series. The phosphorus and sulfur may be mixed together and heated slowly, with agitation, in the presence of the solvent, or one may be dissolved in the solvent at a suitable temperature and the other added in any convenient way, either as a solid or a liquid or in solution in a solvent. If desired, the solvent may be heated to a suitable temperature, and the two elements run in as molten liquids or solutions, agitating the mixture by any suitable means, and maintaining the temperature by the heat evolved by the reaction, or by other suitable means, until the reaction is complete.

While I prefer to use yellow phosphorus on account of its low price, I can use red phosphorus for the process, or I can make an impure or higher sulfid or phosphorus by any known means and treat this with the hot solvent and the proper amount of sulfur or phosphorus to form the pure sesquisulfid or the desired mixture of sulfids. It will therefore be seen that the elements, sulfur and phosphorus, might be brought into the reaction by the use of the more or less crude sulfid of phosphorus, as well as by the individual elements themselves. I have obtained the most satisfactory results by the use of alpha-chlor naphthalin, commercially pure or purified, for the solvent. This liquid boils at a temperature of about 250 degrees centigrade, at which the reaction takes place rapidly and is quickly completed. I can, however, use other high-boiling chlorids of naphthalin, or similar compounds which are able to act as inert solvents.

As an example of the process, I dissolve fifty grams of yellow phosphorus in one hundred cubic centimeters of commercial alpha-chlor naphthalin, and heat the mixture until it boils gently. To prevent loss, I conduct this in an atmosphere of carbon dioxid. Thirty-eight and seven-tenths grams of sulfur are now dissolved in fifty cubic centimeters of commercial alpha-chlor naphthalin, and this solution is heated to about 150 degrees centigrade and slowly added to the boiling phosphorus solution. After adding all of the sulfur, the boiling is continued for about an hour, when the sesquisulfid may be obtained by cooling, filtering, and washing out of the last traces of the solvent by the use of carbon tetrachlorid.

When the sulfids of phosphorus are to be used in the manufacture of matches, it is of the utmost importance that they be in a state of very fine division in order that a match may be made to ignite properly with a minimum amount of sulfid present in the igniting mixture. The sulfids of phosphorus produced by my improved process are in the form of definite crystals of approximately uniform microscopic size, being, in fact, of a size much more minute than can be practically produced by grinding of sulfid of phosphorus. Such grinding is known to be very dangerous. My improved product not only avoids the danger incident to grinding, but reduces the cost of manufacture and renders possible the production of pure phosphorus sesquisulfid or any desired mixture of sulfids of phosphorus in a finely divided state and of a uniform composition.

The use of the high boiling solvent makes it not only possible but practicable to produce sulfids of phosphorus in solution at atmospheric pressure, thereby greatly reducing and substantially eliminating the danger of explosion.

What I claim is:

1. The process of producing sulfids of phosphorus which consists in heating together sulfur and phosphorus in proper proportions at atmospheric pressure in the presence of an inert solvent having a boiling point at least as high as the temperature at which sulfur and phosphorus unite.

2. The process of producing sulfids of phosphorus, which consists in heating together sulfur and phosphorus in proper proportions, in the presence of an inert solvent, having a boiling point of over 180 degrees centigrade.

3. The process of producing phosphorus sesquisulfid in a state of high purity, which consists in heating together sulfur and phosphorus in the proper proportions, in the presence of an inert solvent, at a temperature at least as high as 180 degrees centigrade.

4. The process of producing sulfids of phosphorus, which consists of heating together, in proper proportions, sulfur and phosphorus in the presence of products obtained by the chlorination of a hydrocarbon of the naphthalin series.

5. The process of producing phosphorus sesquisulfid in a state of high purity and fine division, which consists in uniting sulfur and phosphorus in solution in an inert solvent of high boiling point, and in cooling the same, with agitation, so as to thereby precipitate the greater part of the sesquisulfid in the form of a very fine powder.

6. The process of producing phosphorus sesquisulfid either substantially pure or mixed with higher sulfids, or sulfur, or both, from sulfur and phosphorus, which consists in dissolving one of said elements in an inert solvent of high boiling point, heating this solution to a sufficient temperature, and thereafter adding the other of said elements slowly enough to prevent the reaction from becoming violent.

7. The process of producing sulfids of phosphorus which consists in heating together sulfur and yellow phosphorus in proper proportions at atmospheric pressure in the presence of an inert solvent having a boiling point at least as high as the temperature at which sulfur and phosphorus unite, thereby reducing the violence of the reaction between the sulfur and phosphorus.

8. The process of producing sulfids of phosphorus which consists in dissolving yellow phosphorus and sulfur in an inert solvent of high boiling point, at a temperature below that at which they react explosively to form the sulfid, and heating this solution to a higher temperature until the compound is formed.

9. The process of producing sulfids of phosphorus, which consists in heating together sulfur and phosphorus in the proper proportion, in the presence of a high-boiling solvent which burns with great difficulty, thus preventing the reaction from proceeding with undesirable violence and minimizing the danger from fire and loss of material by accident during the process.

In testimony whereof I affix my signature in presence of two witnesses.

FRANCIS C. FRARY.

Witnesses:
HARRY D. KILGORE,
F. D. MERCHANT.